UNITED STATES PATENT OFFICE.

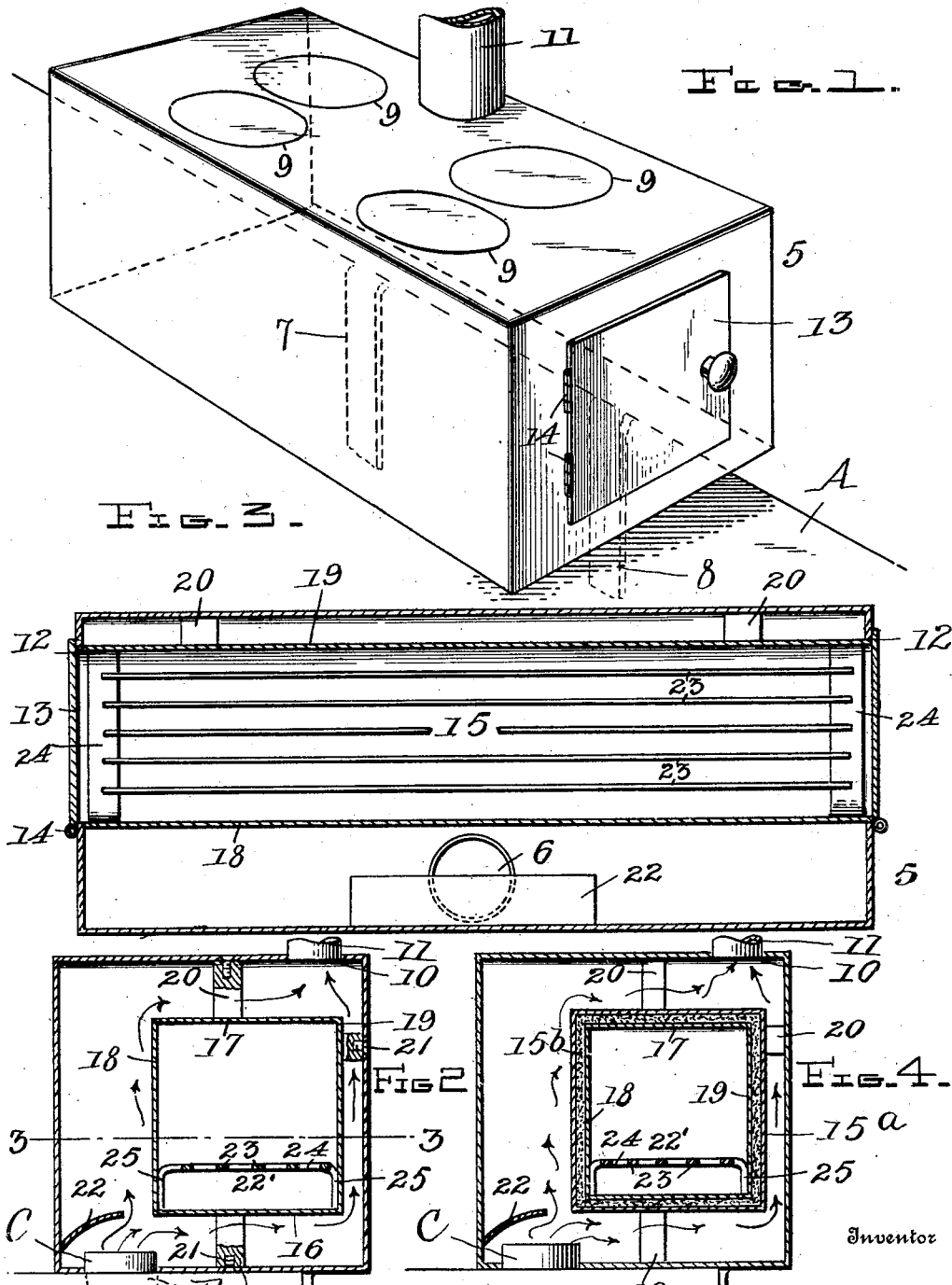

GEORGE T. ADCOCK, OF BURNS, TENNESSEE.

STOVE OR HEATER ATTACHMENT.

No. 897,863.　　　Specification of Letters Patent.　　　Patented Sept. 8, 1908.

Application filed January 7, 1908. Serial No. 409,649.

*To all whom it may concern:*

Be it known that I, GEORGE T. ADCOCK, a citizen of the United States, residing at Burns, in the county of Dickson and State of Tennessee, have invented certain new and useful Improvements in Stove or Heater Attachments, of which the following is a specification.

This invention relates to stove or heater attachments, and has for its object to provide an attachment of this character adapted for use in connection with stoves or heaters of ordinary construction whereby an additional cooking area is provided.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a perspective view of the present invention, Fig. 2 is a transverse sectional view of the attachment showing its application to a stove, Fig. 3 is a horizontal sectional view on the line 3—3 of Fig. 2, Fig. 4 is a view similar to Fig. 2 showing a slightly modified form of my invention.

Referring now more particularly to the drawings there is shown a portion of a stove A of ordinary construction having a product discharge opening B. The opening B is arranged to receive the usual collar or pipe section C.

A casing 5 is disposed upon a portion of the stove A at the rear thereof, and this casing is provided with an opening 6 in its bottom arranged for engagement with the collar or pipe section C, as shown. The casing is provided with depending legs 7 and 8 respectively, and these legs are arranged to lie with their inner faces against the rear wall of the stove A, and are thus arranged to hold the casing in a substantial manner to the stove A. The casing is preferably rectangular in form and the top of the casing is provided adjacent its front wall with a plurality of pot receiving openings 9, and adjacent the rear wall of the casing the top is provided with a discharge opening 10. The opening 10 is thus arranged to receive a pipe section 11 for the discharge of gases.

Each end wall of the casing is provided with an opening 12, and these openings are closed at times by doors 13 hinged as shown at 14 to the ends of the casing.

Disposed within the casing 5, there is shown an oven 15 comprising a bottom 16, a top 17, and connecting sides 18 and 19 respectively. The oven is open at each of its ends, and these open ends of the oven are arranged to lie in line with the openings 12 at each end of the casing 5. The oven is arranged with its side 18 inwardly of the opening 6 of the casing, as shown.

The bottom 16, the top 17 and sides 18 and 19 respectively of the oven 15 are arranged in spaced relation to the walls of the casing 5 by spacing blocks 20 carried by the oven and these blocks are fastened to the walls of the casing by means of screws 21 or the like.

The casing 5 is provided with a deflector 22 secured to the front wall of the same, and this deflector is disposed above the opening B of the stove A, as shown, and serves to direct discharged gases or heat to all sides of the oven 15.

Disposed within the oven there is shown a grate 22' comprising a plurality of longitudinally disposed rods 23 connected at their ends by metallic plates 24. The plates 24 are provided with supporting legs 25 whereby the grate is held in spaced relation to the bottom 16 of the oven.

It will thus be seen that a simple, cheap and effective oven is provided and is adapted to stoves of ordinary construction, and effectively serves to increase the cooking area of stoves. It will of course be understood that an attachment as herein set forth and described may be used in connection with stoves or other heaters in which cooking means are not provided.

In the modified form of my invention the oven is provided with a casing $15^a$, and this casing is arranged with its walls in spaced relation to the walls of the oven, and between the walls of the oven and the walls of the casing $15^a$ there is shown a filling of sand or other similar heat-absorbing material $15^b$.

What is claimed is:

The combination with a stove or heater, of a detachable oven comprising a casing having a heat inlet passage in communication with the discharge passage of the stove or heater, said casing having pot openings in the top wall thereof, closures for said openings, depending members carried by said casing for engagement with the rear wall of said stove or heater, a casing disposed within the first named casing and having spaced walls, heat absorbing material located between the walls of the last named casing, blocks carried by the last named casing for holding the walls of the last named casing in spaced relation to the walls of the first named casing, and fastening devices engaged with the walls of the first named casing and with said blocks respectively.

In testimony whereof I affix my signature, in presence of two witnesses.

GEORGE T. ADCOCK.

Witnesses:
C. G. ADCOCK,
J. A. WYATT.